United States Patent [19]

Mordau et al.

[11] Patent Number: 4,597,323

[45] Date of Patent: Jul. 1, 1986

[54] VEHICLE AIR CONDITIONING INSTALLATION

[75] Inventors: Manfred Mordau, Wildberg; Gerhard Burk, Sindelfingen; Albert Stolz, Tübingen, all of Fed. Rep. of Germany

[73] Assignee: Daimler-Benz Aktiengesellschaft, Fed. Rep. of Germany

[21] Appl. No.: 642,934

[22] Filed: Aug. 21, 1984

[30] Foreign Application Priority Data

Aug. 27, 1983 [DE] Fed. Rep. of Germany ....... 3330951

[51] Int. Cl.⁴ ..................... B60H 1/32; B01D 50/00
[52] U.S. Cl. ..................... 98/2.11; 98/2.17; 55/487
[58] Field of Search ............ 98/2.11, 18, 2.17; 55/488, 180, 188, 96, 487

[56] References Cited

U.S. PATENT DOCUMENTS

| | | | |
|---|---|---|---|
| 2,011,840 | 8/1935 | Arnold et al. | 98/2.17 |
| 2,295,750 | 9/1942 | Norris et al. | 98/2.11 X |
| 3,710,562 | 1/1973 | McKenzie | 55/487 |
| 4,235,298 | 11/1980 | Sackett et al. | 98/2.17 X |

Primary Examiner—William E. Wayner
Attorney, Agent, or Firm—Barnes & Thornburg

[57] ABSTRACT

A fresh air supply device for a heating, ventilating and/or air-conditioning installation of a motor vehicle is provided wherein the fresh air enters through a gap between the windshield and the hood into an air collecting tank. In order to prevent the admission of moisture to an air filter and to prolong its useful life, the water flowing off the windshield and entrained by the airstream is received by a channel oriented in the transverse direction of the vehicle. This channel is followed by a grill for separating out larger particulate matter entrained in the airstream. A downward-pointing ledge adjoins the grill for further demoisturizing and to deflect the air and at least partially covers a dust filter which is arranged in such a position in the airstream that dust dropping from its dirty side falls freely downwards.

5 Claims, 1 Drawing Figure

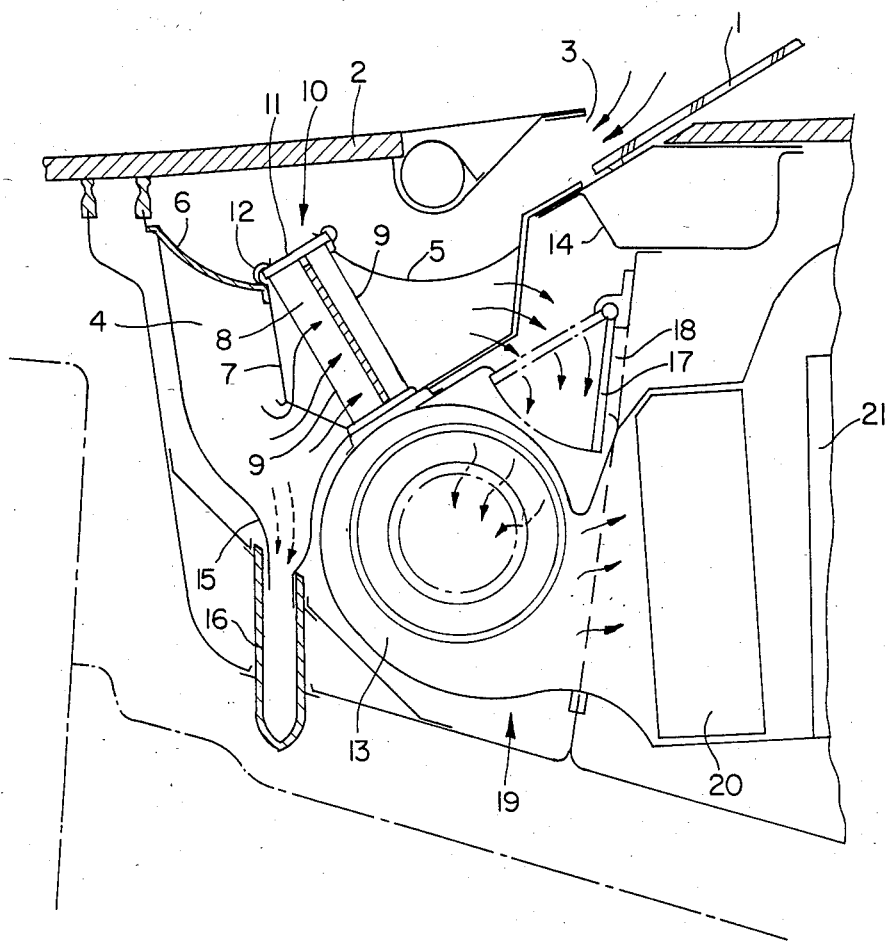

VEHICLE AIR CONDITIONING INSTALLATION

BACKGROUND AND SUMMARY OF THE INVENTION

The present invention relates generally to air filtering devices and, more particularly, to fresh air supply devices for heating, ventilating, and/or air conditioning installation in a motor vehicle.

Motor vehicles have been known to have fresh air inlets. Air flowing through these inlets may have particulate matter entrained therein. It is desirable to remove this particulate matter prior to applying the fresh air flow to the heating, ventilating, and/or air conditioning apparatus of the motor vehicle.

German Pat. No. 1,188,458 provides a device wherein a filter is provided to separate small droplets contained within an inwardly directed airstream. However, if the fresh air flow contains moisture entrained therein also, the useful life of the filter will be significantly reduced or it will be necessary to employ more expensive and durable filter elements. To further reduce both assembly and maintainance costs, it is desirable to provide a simplified and readily accessible filter assembly.

It is therefore an object of the present invention to provide an improved fresh air supply installation for use in motor vehicles.

Another object is the provision of a vehicle fresh air supply having an improved means of filtering particulate matter as well as entrained moisture from the air flow.

A further object is to provide a vehicle fresh air filtering device which exhibits a long useful lifetime and is easy to install and/or replace.

Yet another object is the provision of a vehicle fresh air filtering device which is self-cleaning.

Still another object is to provide a means for preventing moisture entrained in the air flow from being admitted to the dust filter of a vehicle fresh air installation.

These and other objects of the present invention are attained in the provision of a fresh air supply device disposed beneath the fresh air inlet of the vehicle hood and including a channel oriented transversely with respect to the air flow for receiving water flowing off the hood and/or windshield, a relatively coarse mesh grill downstream from the channel for retaining larger particulate matter entrained in the fresh air flow, a downwardly pointing ledge extending from the grill and into an air collecting tank for precipitating entrained moisture and deflecting air flow, and a dust filter at least partially covered by the downwardly pointing ledge and arranged in an oblique position with respect to the air flow such that dust trickling off its dirty side falls freely downward.

Water running off the windshield and entrained as drops by the airstream collects in the channel and flows downward externally and laterally with respect to the air collecting tank. In the following grill, larger impurities in the form of leaves, for example, are retained, while even smaller moisture droplets contained in the airstream are precipitated on the ledge in the course of the deflection process, so that the air which reaches the dust filter is very largely moisture-free. The dust still contained in the air is deposited on the filter surface and, due to the particular installation position of the air filter, can fall freely downward at times of low air throughput and due to vibrations and then be discharged together with the separated water.

The fresh air supply installation of the present invention may be formed into a unitary modular subassembly insertable under the vehicle hood. This subassembly would include the channel, grill, ledge, and dust filter as well as a base outlet which descends, self-centeringly, into a discharge chuck in communication with the open atmosphere. Such a modular subassembly could simplify both initial installation and replacement.

A large effective filter surface is obtained if the dust filter is constructed as a multiply folded paper filter, preferably with vertically oriented folds.

Embodiments of the present invention also include a partition which extends between the channel and the grill to form a filter cover. Upon removal of this partition, the dust filter is extractable for replacement or repair.

Other objects, advantages and novel features of the present invention will become apparent from the following detailed description of the invention when considered in conjunction with the accompanying drawing.

BRIEF DESCRIPTION OF THE DRAWING

The FIGURE shows a partial cross sectional view of a vehicle incorporating the present invention therein.

DETAILED DESCRIPTION OF THE DRAWING

The FIGURE, which illustrates a preferred embodiment of the present invention, shows a portion of a motor vehicle having windshield 1 and an upwardly pivotable hood 2 positioned at an interval in front thereof with a gap 3 therebetween. Fresh air flows through gap 3 into air collecting tank 4, mounted below hood 2. Channel 5 is mounted between gap 3 and tank 4 and is oriented transversely with respect to the vehicle and the direction of air flow. Water running off of windshield 1 and larger drops of moisture entrained in the fresh air flow are collected in channel 5 and are discharged through lateral outlets (not shown).

Grill 6 is mounted across the air flow downstream from channel 5 and has a relatively coarse mesh for retaining the larger impurities and particulate matter entrained in the air flow. Ledge 7 is joined adjacent to grill 6 and extends downwardly therefrom in the air flow to cause the smaller drops of liquid still entrained in the fresh air to precipitate out on its surface. Ledge 7 at least partially covers dust filter 8 and serves also to deflect the airstream away from the entrance to dust filter 8. That dust filter is arranged downstream from ledge 7 at an oblique position with respect to the airstream so that dust falling from the filter surface may fall freely downward under the influence of gravity without affecting adjacent filter regions. Dust may fall off the filter surface at times of low air throughout and/or as a result of vibration. In this manner, dust filter 8 may be said to be self-cleaning.

Dust filter 8 is, for example, constructed as a multiply folded paper filter possessing a large active surface. Paper folds 9 are preferably oriented substantially vertically.

On the air inlet side or upstream from tank 4, partition 10 is disposed to extend between channel 5 and grill 6 to form a filter cover 11 for dust filter 8. This filter cover is retained by fasteners 12 (not shown in detail) and is accessible when hood 2 is raised. When fasteners 12 are released, filter cover 11 and dust filter 8 can be easily extracted upwards for purposes of inspection and/or replacement.

In preferred embodiments of the present invention, air collecting tank 4 is constructed as a prefabricated modular subassembly including channel 5, grill 6, ledge 7, and dust filter 8. This modular subassembly is braced against a fan housing 13 and detachably connected to a vehicle frame part 14 accommodating windshield 1. Tank 4 is provided with outlet 15 at its base which moves self-centeringly into discharge chuck 16 when tank 4 is lowered into position under hood 2. Chuck 16 is in communication with the open atmosphere and opens to release water and dust only when a certain level or volume thereof has been collected.

Fresh air/recirculation air flap 17 is disposed downstream from dust filter 8. In the position illustrated by solid lines in the FIGURE, flap 17 covers recirculated air aperture 18 so that cleaned air leaving dust filter 8 enters fan 19 from which it is discharged towards evaporator 20 and heat exchanger 21 of an air conditioner installation. When flap 17 is in the position illustrated by dashed lines, fresh air is prevented from entering fan 19 and the air conditioner operates with recirculated air.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A fresh air supply device for use with heating, ventilation, and air conditioning installations of motor vehicles having a fresh air inlet at the hood at an interval spaced from the windshield, an air collecting tank downstream from said fresh air inlet, an obliquely positioned filter through which air flows, a ledge means within the air flow and serving to separate moisture from the air flow and to deflect the airstream, and means for discharging said moisture at the base of said tank, further comprising a channel extending from said air inlet and beneath said hood oriented in the transverse direction of the vehicle, a relatively coarse-mesh grill disposed downstream from said channel, said ledge means being disposed adjacent said grill and downwardly pointing and at least partially covering said dust filter, said dust filter being disposed downstream from said ledge means and arranged in such an oblique position in the airstream that dust trickling off its dirty side falls freely downward off said dust filter by the action of gravity.

2. The fresh air supply device according to claim 1 wherein said tank forms a subassembly insertable from above, and wherein said subassembly includes said channel, said grill, said ledge means, said dust filter, and base outlet means which descends self-centeringly into discharge chuck which communicates with the atmosphere.

3. The fresh air supply device according to claim 1 wherein said dust filter is constructed as a multiply folded paper filter with vertically oriented folds.

4. The fresh air supply device according to claim 2 wherein said dust filter is constructed as a multiply folded paper filter with vertically oriented folds.

5. The fresh air supply device according to claim 1 further including partition means extending between said channel and said grill and forming filter cover means for said dust filter such that when said filter cover means is removed, said dust filter is extractable.

* * * * *